United States Patent [19]

Kim

[11] Patent Number: 5,089,898
[45] Date of Patent: Feb. 18, 1992

[54] VIDEO BLANKING SYSTEM FOR A VIDEO CASSETTE RECORDER COMBINED WITH A VIDEO CAMERA

[75] Inventor: Dong Young Kim, Suwon, Rep. of Korea

[73] Assignee: SamSung Electronics Co., Ltd., Suwon, Rep. of Korea

[21] Appl. No.: 371,828

[22] Filed: Jun. 27, 1989

[30] Foreign Application Priority Data

Jun. 27, 1988 [KR] Rep. of Korea ............... 1988-7754

[51] Int. Cl.$^5$ ............................................. H04N 5/76
[52] U.S. Cl. .............................. 358/335; 358/183
[58] Field of Search ............ 358/183, 22, 335, 181

[56] References Cited

U.S. PATENT DOCUMENTS

| | | | |
|---|---|---|---|
| 4,395,733 | 7/1983 | Elenbaas | 358/183 |
| 4,488,180 | 12/1984 | Rabinowitz | 358/183 |
| 4,780,763 | 10/1988 | McFetridge et al. | 358/183 |

FOREIGN PATENT DOCUMENTS 0199276 10/1985 Japan .............................. 358/183

*Primary Examiner*—Tommy P. Chin
*Attorney, Agent, or Firm*—Robert E. Bushnell

[57] ABSTRACT

A video blanking system for a VCR combined with a video camera which enables the picture to occupy the screen gradually and to be gradually removed from the screen at the start and at the end of recording respectively as if a curtain rises or falls across the front of the screen. The video blanking system includes a key input device for selecting a blanking function, a device for blanking a video signal from a camera section to a VCR section, a device for separating the video signal into vertical and horizontal synchronizing signals, and a signal processing device which sends a control signal to the blanking device in proportion to a period which corresponds to the number of horizontal synchronizing signals equal to the vertical synchronizing input to the signal processing device.

25 Claims, 3 Drawing Sheets

VIDEO BLANKING SYSTEM FOR A VIDEO CASSETTE RECORDER COMBINED WITH A VIDEO CAMERA

BACKGROUND OF THE INVENTION

1. Field of the Invention

The present invention relates to a video blanking system for a video cassette recorder (VCR) combined with a video camera, and more particularly to a video blanking system which enables a picture on a screen to be gradually blanking as if a curtain rises and falls across the front of the screen at the start and at the end of the recording, respectively.

2. Description of the Prior Art

In the conventional VCR combined with a camera, the entire picture is recorded immediately when the filming by the camera starts and it is impossible to have any special visual effects when the reproduction of picture starts or ends.

SUMMARY OF THE INVENTION

It is an object of the present invention to provide a video blanking system which enables the picture to occupy the screen gradually from its lower portion at the start of recording, and to be gradually removed from its upper portion at the end of recording.

In accordance with the present invention, there is provided a video blanking system for a VCR combined with a video camera including: a key input device for selecting a blanking function, a camera section which outputs a video signal in response to an optical image formed by a lens, a device for separating the video signal from the camera section into a vertical synchronizing signal and a horizontal synchronizing signal, a signal processing device receiving a key signal from the key input device and the vertical and the horizontal synchronizing signals from the signal separating device and outputting a control signal during a period which corresponds to the number of the horizontal synchronizing signals equal to that of the input vertical synchronizing signals in accordance with the key signal, and a blanking device which cuts out the video signal output from the camera section to a VCR section while the control signal is applied from the signal processing device.

BRIEF DESCRIPTION OF THE DRAWINGS

The present invention will now be described by way of illustrative examples with reference to the accompanying drawings, in which.

DETAILED DESCRIPTION OF THE PREFERRED EMBODIMENT

Figure 1:
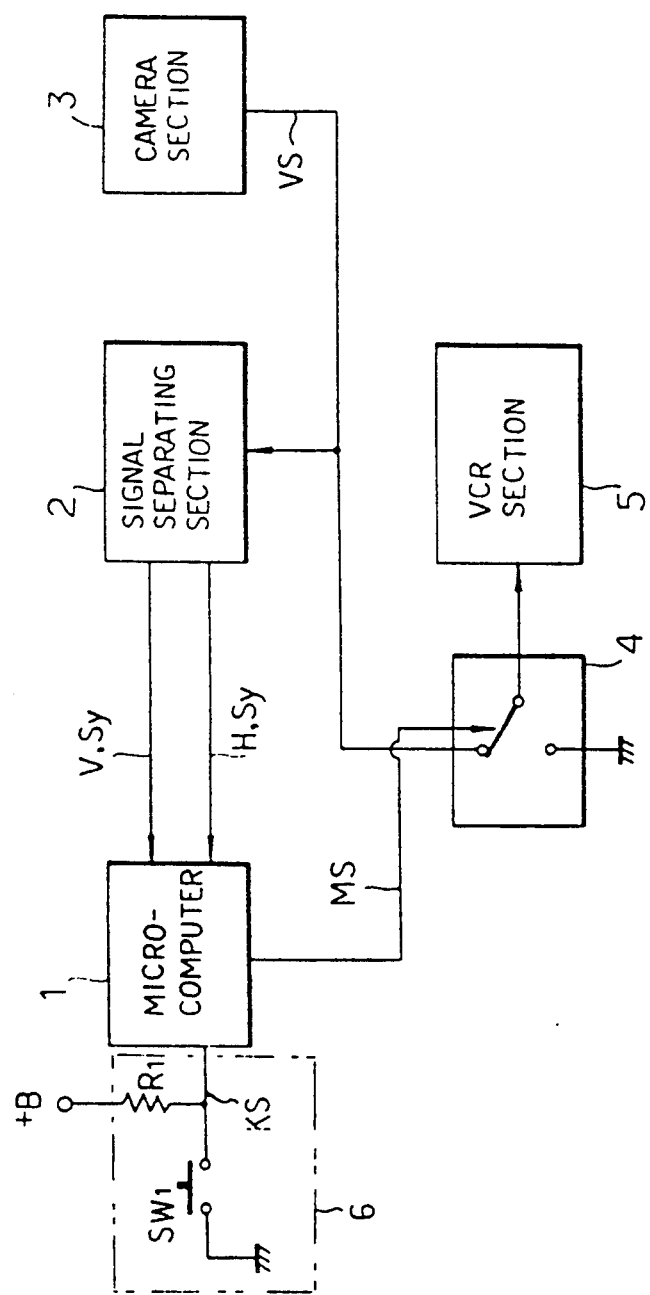
FIG. 1 is a schematic block diagram of the embodiment of the present invention.
Figure 2:
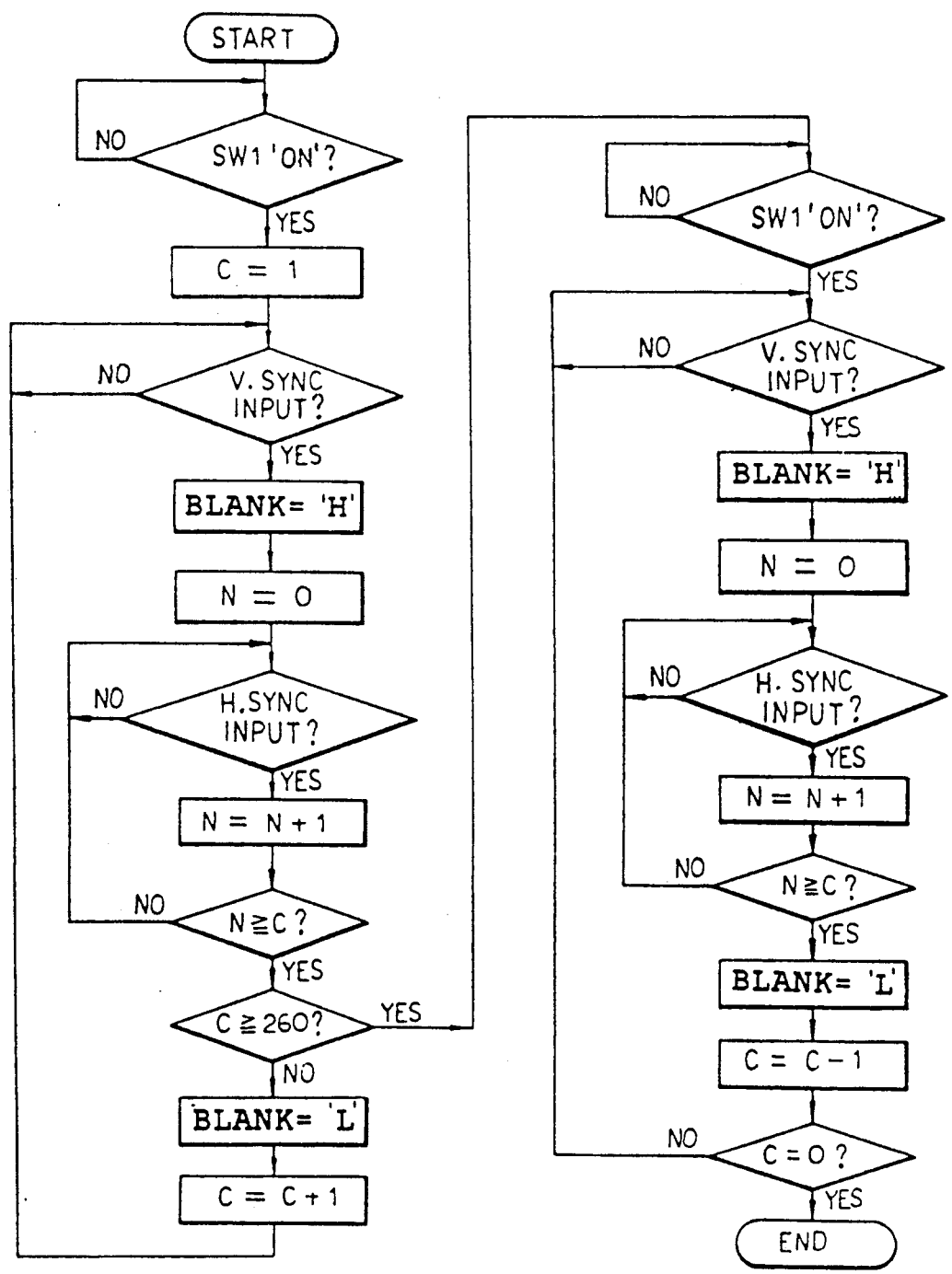
FIG. 2 is a flow chart illustrating the operation of the present invention.

Referring to FIGS. 1 to 3, the operation of the system according to the present invention will be described.

In the embodiment of the present invention, the key input section 6 includes a control switch SW1, preferably an electronic switch, and a pull-up resistor R1. When the switch SW1 is touched during the filming by the camera, the key input section 6 outputs a key signal KS consisting of a negative pulse to the signal processing device. Preferably, the signal processing device is a microcomputer 1.

At this moment the video signal VS output from the camera section 3 is applied to the signal separating section 2 and is separated into the vertical and horizontal synchronizing signals V.Sy and H.Sy. These signals are then applied to the microcomputer 1.

As shown in FIG. 2, the microcomputer 1 outputs the blanking signal MS of "high" level during the period corresponding to one horizontal synchronizing signal H.Sy when the first vertical synchronizing signal V.Sy is input to the microcomputer 1. When the second vertical synchronizing signal V.Sy is input, the microcomputer 1 then outputs the blanking signal MS of "high" level during the period corresponding to two horizontal synchronizing signals H.Sy. The described muting signals MS of "high" level are input to the blanking section 4, causing the muting section 4 to cut out the video signal to the VCR section 5.

Figure 3A:
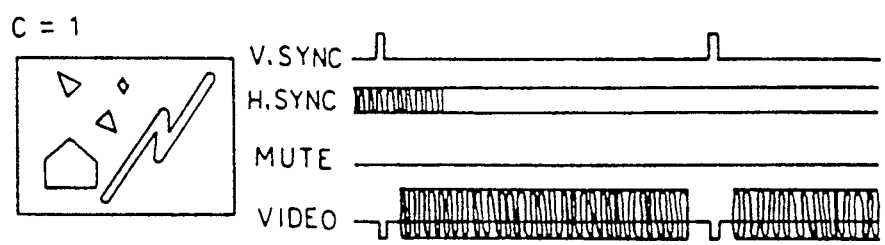
FIGS. 3A-3E are waveform diagrams useful for describing the blanking operation according to the present invention.
Figure 3B:
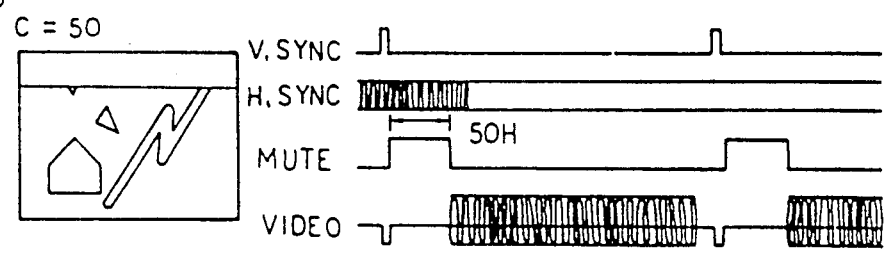
Figure 3C:
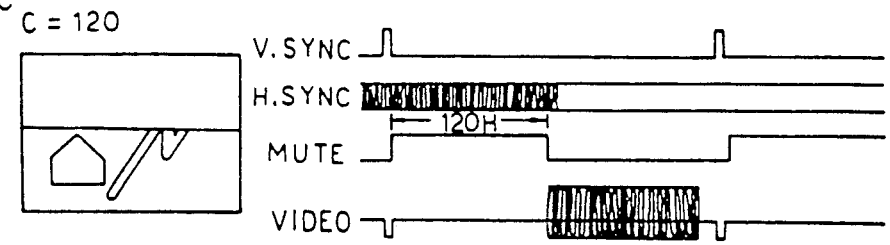
Figure 3D:
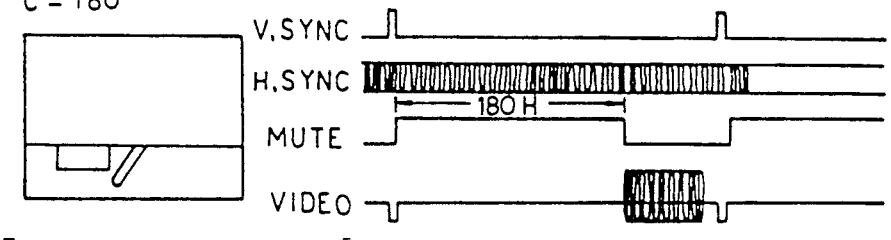
Figure 3E:
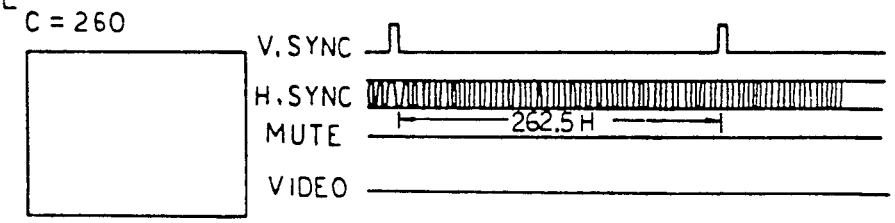

As described above, the microcomputer 1 counts the number N of horizontal synchronizing signals as much as the number C of the input vertical synchronizing signals and outputs blanking signal MS during the period corresponding to the number N of the horizontal synchronizing signals, resulting in that the picture on the screen is gradually removed from its upper portion at the end of recording. In more detail, when C=1, i.e., when one vertical synchronizing signal is input, almost the whole picture appears on the screen (See FIG. 3(A)). When C is increased to 50, the upper portion of the picture is removed as shown in FIG. 3(B). Consequently the removed portion of the picture increases in proportion to the increase of the number C as shown in FIG. 3(C) and (D). Thus, when C=260, the picture will be removed completely as shown in FIG. 3(E).

As described above, the special visual effect can be obtained as if a curtain falls across the front of the screen. Practically, the frequency of the vertical synchronizing signal V.Sy is about 60 Hz, and the complete falling of the curtain takes about 4.3 seconds.

On the other hand, when the switch SW1 of the key input section 6 is touched again in the state that the picture is completely removed, the picture reappears gradually from its lower portion contrary to the above-described curtain falling operation. For example, as the number C decreases one by one from C=260, the blanking time of the picture also decreases gradually. When C=0 finally, a complete picture appears on the screen. The complete rising of the curtain also takes about 4.3 seconds.

From the foregoing, it will be apparent that the present invention provides a novel video blanking system for a VCR combined with a video camera which enables the picture to occupy the screen gradually from its lower portion and to be gradually removed from its upper portion at the start and at the end of recording, respectively, and that by reason of the invention it is possible to have a special visual effect as if a curtain rises or falls across the front of the screen.

While the present invention has been described and illustrated herein with reference to the preferred embodiments thereof, it will be understood by those skilled in the art that various changes in form and details may be made therein without departing from the spirit and scope of the invention.

What is claimed is:

1. A video blanking system for a video cassette recorder combined with a video camera, comprising:

key input means for selecting a key signal representing a blanking function;

a video camera section for generating video signals in response to an optical image formed by a lens;

means for separating said video signals, from said video camera section, into vertical and horizontal synchronizing signals;

signal processing means receiving the key signal and said vertical and horizontal synchronizing signals from said key input means and said signal separating means respectively, said signal processing means responding to said key signal by generating a control signal during a period corresponding to a number of said horizontal synchronizing signals, said number of horizontal synchronizing signals being equal to a number of said vertical synchronizing signals received subsequent to selection of said key signal; and blanking means coupled to receive said control signal for interrupting transmissions of said video signal output from said camera section to the video cassette recorder when said control signal is received from said signal processing means by said blanking means, wherein a picture occupies a video display screen gradually starting from a lower portion or is gradually removed starting from an upper portion of said video display screen during successive ones of said period.

2. The video blanking system of claim 1, further comprised of said signal processing means making a count of said vertical synchronizing signals in response to reception of said key signal, and changing said number of horizontal synchronizing signals in dependence upon change in said count.

3. The video blanking system of claim 2, further comprised of said signal processing means changing said number of horizontal synchronizing signals by one in response to each change in said count.

4. The video blanking system of claim 2, further comprised of said signal processing means incrementing said number of said horizontal synchronizing signals in response to each change in said count after said key signal is selected a first time.

5. The video blanking system of claim 2, further comprised of said signal processing means incrementing said number of said horizontal synchronizing signals by one in response to each change in said count after said key signal is selected a first time.

6. The video blanking system of claim 2, further comprised of said signal processing means decrementing said number of said horizontal synchronizing signals in response to each change in said count after said key signal is selected a second time.

7. The video blanking system of claim 2, further comprised of said signal processing means decrementing said number of said horizontal synchronizing signals by one in response to each change in said count after said key signal is selected a second time.

8. The video blanking system of claim 4, further comprised of said signal processing means decrementing said number of said horizontal synchronizing signals in response to each change in said count after said key signal is selected a second time.

9. The video blanking system of claim 5, further comprised of said signal processing means decrementing said number of said horizontal synchronizing signals by one in response to each change in said count after said key signal is selected a second time.

10. A video blanking process, comprising the steps of:

selecting a key signal representing a blanking function;

generating a video signal in response to an optical image formed by a lens;

separating said video signal into vertical and horizontal synchronizing signals;

responding to said key signal by generating a control signal during a period corresponding to a number of said horizontal synchronizing signals, said number of horizontal synchronizing signals being equal to a number of said vertical synchronizing signals occurring subsequent to selection of said key signal; and interrupting transmissions of said video signal output to a video cassette recorder after said control signal is received, wherein a picture occupies a video display screen gradually starting from a lower portion or is gradually removed starting from an upper portion of said video display screen during successive ones of said period.

11. The video blanking process of claim 10, further comprising the steps of:

making a counting of said vertical synchronizing signals in response to reception of said key signal, and changing said number of horizontal synchronizing signals in dependence upon change in said count.

12. The video blanking process of claim 11, wherein the step of changing said number of horizontal synchronizing signals further comprises:

changing said number of horizontal synchronizing signals by one in response to each change in said count.

13. The video blanking process of claim 11, wherein the step of changing said number of horizontal synchronizing signals further comprises:

incrementing said number of said horizontal synchronizing signals in response to each change in said count after said key signal is selected a first time.

14. The video blanking process of claim 11, wherein the step of changing said number of horizontal synchronizing signals further comprises:

incrementing said number of said horizontal synchronizing signals by one in response to each change in said count after said key signal is selected a first time.

15. The video blanking process of claim 11, wherein the step of changing said number of horizontal synchronizing signals further comprises:

decrementing said number of said horizontal synchronizing signals in response to each change in said count after said key signal is selected a second time.

16. The video blanking process of claim 12, wherein the step of changing said number of horizontal synchronizing signals further comprises:

decrementing said number of said horizontal synchronizing signals by one in response to each change in said count after said key signal is selected a second time.

17. The video blanking process of claim 13, wherein said step of changing said number of horizontal synchronizing signals further comprises:

decrementing said number of said horizontal synchronizing signals in response to each change in said count after said key signal is selected a second time.

18. The video blanking process of claim 14, wherein the step of changing said number of horizontal synchronizing signals further comprises:

decrementing said number of said horizontal synchronizing signals by one in response to each change in said count after said key signal is selected a second time.

19. A video effect circuit, comprising:

terminal means connectable to a source of video signals, for transmitting said video signals to a video display;

means for receiving said video signals from the source and for separating vertical and horizontal synchronizing signals from said received video signals;

means for making selections of blanking functions; and control means coupled for interrupting said transmitting of said video signals to the video display during successive periods corresponding to a number of successive ones of said horizontal synchronizing signals in response to said selections of blanking functions, said number of successive ones of said horizontal synchronizing signals being equal to a number of said vertical synchronizing signals received after one of said selections of blanking functions.

20. The video blanking system of claim 19, further comprised of said control means making a count of said vertical synchronizing signals in response to said one of said selections of blanking functions, and changing said number of successive ones of said horizontal synchronizing signals in dependence upon change in said count.

21. The circuit of claim 20, further comprised of said control means changing said number of successive ones of said horizontal synchronizing signals by one in response to each change in said count.

22. The circuit of claim 20, further comprised of said control means incrementing said number of successive ones of said horizontal synchronizing signals in response to each change in said count after said one of said blanking functions is selected a first time.

23. The circuit of claim 20, further comprised of said control means incrementing said number of successive ones of said horizontal synchronizing signals by one in response to each change in said count after said one of said blanking functions is selected a first time.

24. The circuit of claim 22, further comprised of said control means decrementing said number of successive ones of said horizontal synchronizing signals in response to each change in said count after said one of said blanking functions is selected a second time.

25. The circuit of claim 23, further comprised of said control means decrementing said number of successive ones of said horizontal synchronizing signals by one in response to each change in said count after said one of said blanking functions is selected a second time.

* * * * *

UNITED STATES PATENT AND TRADEMARK OFFICE
CERTIFICATE OF CORRECTION

PATENT NO. : 5,089,898
DATED : Febuary 18, 1992
INVENTOR(S) : Dong Young Kim

It is certified that error appears in the above-indentified patent and that said Letters Patent is hereby corrected as shown below:

Column 1, Line 12, Change "blanking" to --blanked-- ;

Column 2, Line 19, Change "muting" to --blanking-- .

Signed and Sealed this

Tenth Day of October, 1995

Attest:

BRUCE LEHMAN

*Attesting Officer*  Commissioner of Patents and Trademarks